US011722022B2

United States Patent
Fröhlich et al.

(10) Patent No.: US 11,722,022 B2
(45) Date of Patent: Aug. 8, 2023

(54) ROTOR FOR AN ELECTRICAL MACHINE OF A MOTOR VEHICLE, AND METHOD FOR PRODUCING SUCH A ROTOR

(71) Applicant: Vitesco Technologies GMBH, Hannover (DE)

(72) Inventors: Holger Fröhlich, Berlin (DE); Christoph Heise, Ludwigsfelde (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 288 days.

(21) Appl. No.: 16/787,962

(22) Filed: Feb. 11, 2020

(65) Prior Publication Data
US 2020/0177038 A1    Jun. 4, 2020

Related U.S. Application Data

(63) Continuation of application No. PCT/EP2018/068514, filed on Jul. 9, 2018.

(30) Foreign Application Priority Data

Aug. 17, 2017    (DE) ..................... 10 2017 214 309.6

(51) Int. Cl.
*H02K 1/27*    (2022.01)
*H02K 1/28*    (2006.01)
(Continued)

(52) U.S. Cl.
CPC ............... *H02K 1/276* (2013.01); *H02K 1/28* (2013.01); *H02K 15/03* (2013.01); *H02K 15/12* (2013.01);
(Continued)

(58) Field of Classification Search
CPC .......... H02K 15/12; H02K 1/276; H02K 1/28; H02K 15/03; B60Y 2200/91; B60Y 2200/92; B60K 6/26; B60K 1/00
(Continued)

(56) References Cited

U.S. PATENT DOCUMENTS 8,020,280 B2    9/2011    Fukumaru et al.
8,058,767 B2    11/2011    Haruno et al.
(Continued)

FOREIGN PATENT DOCUMENTS

CN    1305257 A    7/2001
CN    102484404 A    5/2012
(Continued)

OTHER PUBLICATIONS

Chinese Office Action dated Aug. 4, 2021 for corresponding Chinese Patent Application No. 2017P03797WOCN.
(Continued)

*Primary Examiner* — Alex W Mok

(57) ABSTRACT

A rotor for an electrical machine has at least one laminated core with a multiplicity of magnet pockets arranged in succession in an axial direction of the rotor. There are magnets fixed by a cured potting compound within the magnet pockets. The magnet pockets are fluidically connected to one another via at least one distributor system formed in the laminated core which has, at least one filling channel for each pocket fluidically connected to the respective pockets. The distributor system has at least one distributor channel common to and fluidically connected to the filling channels. The cured potting compound extends continuously through the distributor system from magnet pocket to magnet pocket.

11 Claims, 13 Drawing Sheets

(51) Int. Cl.
*H02K 15/03* (2006.01)
*H02K 15/12* (2006.01)
*H02K 1/276* (2022.01)
*B60K 1/00* (2006.01)
*B60K 6/26* (2007.10)

(52) U.S. Cl.
CPC ................. *B60K 1/00* (2013.01); *B60K 6/26* (2013.01); *B60Y 2200/91* (2013.01); *B60Y 2200/92* (2013.01)

(58) Field of Classification Search
USPC .................................................... 310/156.56
See application file for complete search history.

(56) References Cited

U.S. PATENT DOCUMENTS

| | | | |
|---|---|---|---|
| 8,728,375 | B2 | 5/2014 | Matsubayashi et al. |
| 9,112,393 | B2 | 8/2015 | Jayasoma et al. |
| 9,653,975 | B2 * | 5/2017 | Ishimatsu ............... H02K 1/276 |
| 9,979,246 | B2 | 5/2018 | Helbling |
| 2008/0276446 | A1 | 11/2008 | Amano et al. |
| 2009/0278417 | A1 * | 11/2009 | Mizuno ................. H02K 1/276 |
| | | | 310/156.53 |
| 2013/0334910 | A1 * | 12/2013 | Takahashi ................. H02K 9/22 |
| | | | 310/52 |
| 2014/0062243 | A1 * | 3/2014 | Falk ........................ H02K 1/22 |
| | | | 310/156.08 |
| 2014/0077652 | A1 * | 3/2014 | Yamagishi ............... H02K 1/28 |
| | | | 310/156.21 |
| 2014/0103574 | A1 | 4/2014 | Ishimatsu |
| 2015/0061445 | A1 * | 3/2015 | Ishimatsu ............... H02K 1/276 |
| | | | 29/598 |
| 2016/0377082 | A1 | 12/2016 | Fecke et al. |
| 2020/0106314 | A1 * | 4/2020 | Schulde ................. H02K 1/276 |

FOREIGN PATENT DOCUMENTS

| | | | | |
|---|---|---|---|---|
| CN | 103872822 | A | 6/2014 | |
| CN | 105075070 | A | 11/2015 | |
| CN | 106357030 | A | 1/2017 | |
| DE | 102008027758 | A1 | 12/2009 | |
| DE | 102009054584 | A1 * | 6/2011 | ............ H02K 15/03 |
| EP | 2187503 | A2 | 5/2010 | |
| JP | 2001157394 | A | 6/2001 | |
| JP | 2002034187 | A | 1/2002 | |
| JP | 2006077625 | A | 3/2006 | |
| JP | 2014036486 | A | 2/2014 | |
| WO | 2007080661 | A1 | 7/2007 | |

OTHER PUBLICATIONS

International Search Report and Written Opinion dated Oct. 12, 2018 from corresponding International Patent Application No. PCT/EP2018/068514.

German Office Action dated Apr. 16, 2018 for corresponding German Patent Application No. 10 2017 214 309.6.

Chinese Notice of Allowance dated Jun. 15, 2022 for corresponding Chinese patent application No. 201880052061.9.

* cited by examiner

ROTOR FOR AN ELECTRICAL MACHINE OF A MOTOR VEHICLE, AND METHOD FOR PRODUCING SUCH A ROTOR

CROSS-REFERENCE RELATED APPLICATIONS

This application claims the benefit of PCT Application PCT/EP2018/068514, filed Jul. 9, 2018, which claims priority to German Application DE 10 2017 214 309.6, filed Aug. 17, 2017. The disclosures of the above applications are incorporated herein by reference.

TECHNICAL FIELD

The invention relates to a rotor for an electrical machine, in particular of a motor vehicle.

BACKGROUND

Rotors for electrical machines, in particular of motor vehicles, and methods for producing such rotors are known from the general prior art.

A rotor has a laminated core, which is also referred to as rotor laminated core. The laminated core itself has a multiplicity of magnet pockets arranged on the rotor and thus of the laminated core and in which respective magnets are received, which are fixed in the magnet pockets by means of a cured potting compound. For example, the magnets are cohesively connected to the laminated core by means of the potting compound, whereby the magnets are held on the laminated core and thereby fixed in the magnet pockets.

The common procedure for pouring the potting compound into the magnet pockets or into the spaces is as follows: The rotor or the laminated core is set up vertically, such that, for example, the axial direction of the laminated core or of the rotor runs in the vertical direction. Thus, for example, respective individual laminations, also referred to as rotor laminations, of the laminated core are arranged in respective horizontal planes or run horizontally. The individual laminations are for example arranged one behind the other or in succession in the axial direction of the laminated core and are stacked, or stacked on top of one another, in a stacking direction, wherein the stacking direction coincides for example with the axial direction of the rotor or of the laminated core.

After the laminated core has been set up vertically, the liquid potting compound is commonly poured in the vertical direction from above into the usually very small spaces between the laminated core and the magnets. The potting compound then chemically crosslinks to form a solid, as a result of which the magnets are fixed in the magnet pockets. The chemical cross-linking of the initially liquid potting compound to form the solid is also referred to as curing of the potting compound.

This conventionally provided procedure for introducing the potting compound into the magnet pockets has disadvantages. Potting is a very time-consuming process. On the one hand, the potting compound is only poured into one of the spaces or into one of the magnet pockets at any given time. A separate cycle is therefore required for each magnet pocket or for each stack of magnet pockets or magnets arranged one above the other, in the course of which cycle the potting compound is introduced into the respective magnet pocket or into the respective space. On the other hand, it is usually possible firstly for the potting compound to flow from top to bottom in the small space and secondly for air situated in the space to rise upward in equilibrium therewith. The filling of the space with the potting compound can thus only take place in the equilibrium between the ventilation, on the one hand, and the inflow of potting compound, on the other hand, which leads to a considerable expenditure of time and therefore cost.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A rotor can be produced in a simple and thus time-saving and cost-effective manner.

A first aspect has a rotor for an electrical machine, in particular of a motor vehicle, such as for example a motor car. The rotor has at least one laminated core, which is also referred to as rotor laminated core. The laminated core itself has a multiplicity of magnet pockets which are arranged in succession or one behind the other in an axial direction of the rotor and in which respective magnets are received. This means, for example, that at least one magnet is received in the respective magnet pocket. The respective magnet may in particular be designed as a permanent magnet, wherein the electrical machine is designed, for example, as a dynamo-electric machine. Here, the magnets are fixed in the magnet pockets by means of a cured potting compound. For example, the magnets are cohesively connected to the laminated core by means of the potting compound and thereby fixed in the magnet pockets.

In order to be able to produce the rotor in simple, time-saving, and cost-effective manner a distributor system is provided or formed, in particular in the laminated core, wherein the magnet pockets are fluidically connected to one another via the distributor system. The distributor system has, for each magnet pocket that is fluidically connected to the distributor system, at least one filling channel fluidically connected to the respective magnet pocket, wherein the distributor system furthermore has at least one distributor channel which is common to the filling channels and is fluidically connected to the filling channels. Furthermore, the cured potting compound extends continuously, that is to say for example without interruption, through the distributor system from magnet pocket to magnet pocket.

Through the use of the distributor system, it is possible to introduce the potting compound in its liquid state into the distributor system, in particular into the distributor channel and, via this, into the distributor system, for example by virtue of the initially liquid potting compound being filled into the distributor channel. The liquid potting compound can then flow through the distributor channel and flow from the distributor channel into the respective filling channels and flow through the respective filling channels. The liquid potting compound can finally flow from the filling channels into the respective magnet pockets and, for example, impinge on and flow around the respective magnets arranged in the respective magnet pockets.

The potting compound then cures, for example, as a result of which the magnets are fixed in the magnet pockets. Here, the cured potting compound is situated both in the magnet pockets and also in the filling channels and in the distributor channel, such that, for example, the cured potting compound extends continuously or without interruption through the distributor system from one of the magnet pockets to the respective other magnet pockets. In the cured state, the cured potting compound thus forms, for example, a single-piece framework, which is also referred to as a lattice, clamping structure or structure. The magnets are fixed in the magnet pockets by means of the structure. Furthermore, the structure may provide damping, such that, for example, excessive vibrations and resulting noises, in particular during operation of the electrical machine, can be avoided.

The magnets and the magnet pockets, which are also referred to simply as pockets, are each provided for example in a predefinable number, which can be set as required.

In one embodiment, in order to be able to easily and reliably introduce, in particular insert, the magnets, designed for example as permanent magnets, into the magnet pockets, the magnet pockets designed as recesses are dimensioned, in particular orthogonally to the axial direction of the rotor or of the laminated core, so as to be larger than the magnets. For example, the magnets received in the magnet pockets can still move relative to the laminated core when the magnets are not fixed in the magnet pockets.

The magnets are fixed in the magnet pockets or on the laminated core by means of the potting compound, which is introduced, in particular poured, into the respective magnet pockets. Here, the potting compound is introduced into respective spaces or gaps between the magnets and the laminated core. The pouring, also referred to as potting, of the potting compound into the magnet pockets is commonly carried out manually using a commercially available syringe, such that the pouring is carried out in the form of a manual potting process. However, such a manual potting process may be time-consuming and therefore expensive.

The rotor according to at least one embodiment with the magnets, which are also referred to as buried magnets, enables potting to be carried out in an automated manner and more easily than with conventional methods. The rotor can thus be manufactured particularly cost-effectively.

Through the use of the distributor system, which is also referred to as distributor structure, for example, it is possible to introduce the potting compound in the liquid state into the distributor system at exactly or at least one or multiple points, whereupon the potting compound can flow from the respective point through the distributor system and into the magnet pockets. Provision is therefore not made, and it is not necessary, for each magnet pocket or each stack to be separately or individually filled with the potting compound. For example, a predeterminable number of gate points is provided, via which the potting compound can be introduced, in particular filled, into the distributor system, in particular into the distributor channel.

The distributor channel is for example spaced apart in the radial direction of the laminated core from the respective magnet pockets and, here, is fluidically connected to the magnet pockets via the filling channels which extend for example at least substantially in the radial direction, in particular from the inside outward. By means of the filling channels, it is thus for example possible for the potting compound to be distributed from the distributor channel in a cross-sectional plane orthogonal to the stacking direction and to be guided from the distributor channel, in particular in an outward radial direction, to the magnet pockets. For example, the distributor channel extends at least substantially in the axial direction of the laminated core.

In an embodiment, at least one end plate is provided, which adjoins the laminated core in the axial direction of the rotor.

The end plate may have at least one filling opening which is fluidically connected to the distributor channel and via which the potting compound can be or is filled in its liquid state into the distributor system. The filling opening is thus, for example, one of the gate points mentioned above. In this embodiment, it is for example possible to introduce the potting compound into the distributor system and, via this, into the magnet pockets, while the laminated core, in particular the individual laminations, is or are braced or compressed, and thus held together, by means of the end plate. As a result, the rotor can be handled in a particularly simple manner and can consequently be produced expediently in terms of time and costs.

The end plate may have at least one ventilation opening which is fluidically connected to the distributor system and which serves for the ventilation of the distributor system as the potting compound is filled into the distributor system. In particular, the ventilation opening is spaced apart or separated from the filling opening such that, for example, via the ventilation opening, air initially accommodated in the distributor system and thus in particular in the magnet pockets can be discharged from the distributor system and in particular from the magnet pockets, and can flow for example to the surroundings of the laminated core, as the potting compound is filled into the distributor system via the filling opening. As a result, the potting compound, in particular starting from the filling opening, can distribute quickly in the distributor system and flow via the distributor system into the magnet pockets, such that the magnets can be provided with the potting compound, that is to say potted, in a time-saving and thus cost-effective manner.

In order to be able to introduce the potting compound in a large quantity into the distributor system it is provided in a further embodiment that a second end plate is provided, which adjoins the laminated core in the axial direction of the rotor on a side, in particular end side, of the laminated core which is averted from the first end plate in the axial direction. Thus, the laminated core, in particular the individual laminations, is arranged in the axial direction between the end plates, such that, for example, the laminated core is braced or compressed or pressed together by means of the end plates. Here, the second end plate has at least one ventilation opening which is fluidically connected to the distributor system and which serves for the ventilation of the distributor system as the potting compound is filled into the distributor system. The statements made above and below regarding the ventilation opening mentioned first can readily also be transferred to the ventilation opening mentioned second, and vice versa.

In order to be able to fix the magnets in the magnet pockets in a simple and thus time-saving and cost-effective manner, it is provided in a further embodiment of the invention that a first part of the respective magnet pocket is formed by a first individual lamination of the laminated core, and a second part, which directly adjoins the first part in the axial direction of the rotor, of the respective magnet pocket is formed by a second individual lamination, which directly adjoins the first individual lamination in the axial direction of the rotor, of the laminated core.

The respective parts may differ from one another in terms of their shapes and/or in terms of their inner circumferences. As a result, the potting compound can be distributed quickly in the magnet pocket and fix the respective magnets in an effective manner.

Here, in order to fix the magnets, for example, to connect the individual laminations to one another, it is provided in a further embodiment that the respective parts differ in terms of their shapes and/or inner circumferences and thereby form at least one undercut of the respective magnet pocket.

Another embodiment is characterized in that the individual laminations are formed by identical lamination blanks and are arranged so as to be rotationally staggered with respect to one another in a circumferential direction of the rotor. As a result, the number of identical parts can be made high, such that the costs can be kept in a low range.

the individual laminations may be formed by lamination blanks that are different from one another. This makes it possible to realize varying geometries, in particular shapes and/or inner circumferences, of the magnet pockets or of the parts, such that fixing can be implemented in a simple manner.

In a further embodiment, the respective magnet pocket has at least one protuberance extending in a radial direction of the rotor, as a result of which the magnets can be potted in a cost-effective manner.

In order to furthermore achieve high performance of the electrical machine, the magnet pockets and the magnets may be offset, such that the rotor has an offset.

In order to now be able to fix the magnets of the rotor, which are for example in the form of permanent magnets, in the magnet pockets, it may be provided in a further embodiment that the magnet pockets form a first pocket group. Here, the laminated core has at least one second pocket group which is arranged adjacent to the first pocket group in the circumferential direction of the laminated core and which comprises a multiplicity of second magnet pockets arranged in succession or one behind the other in the axial direction of the rotor. In the second magnet pockets there are received respective second magnets, in particular permanent magnets, such that, for example, at least one second magnet is received in the respective second magnet pocket. The second magnets are fixed in the second magnet pockets by means of the cured potting compound.

Here, the second magnet pockets are fluidically connected to one another, and in particular fluidically connected to the first magnet pockets, via the distributor system, wherein the distributor system, for each second magnet pocket, has at least one second filling channel fluidically connected to the respective second magnet pocket. In addition, the distributor system has the at least one distributor channel which is common to the first filling channels and the second filling channels and which is fluidically connected to the first filling channels and fluidically connected to the second filling channels, via which distributor channel, for example, the initially liquid potting compound can flow into the filling channels and then into the first magnet pockets and the second magnet pockets.

The cured potting compound extends continuously through the distributor system from magnet pocket to magnet pocket of the respective pocket group. In other words, the cured or solidified and thus inherently rigid potting compound extends through the distributor system from one of the pocket groups to the respective other pocket group and also through the distributor system from magnet pocket to magnet pocket within the respective pocket group, such that both the first magnets and the second magnets are fixed by means of the aforementioned single-piece framework to the laminated core and thus in the respective magnet pockets. In this embodiment, it is thus possible not only for the first magnets to be potted and consequently fixed in the first magnet pockets of the first pocket group in a simple and thus time-saving and cost-effective manner, but also for the second magnets to be potted and consequently fixed in the second magnet pockets of the second pocket group in a simple and thus time-saving and cost-effective manner.

Here, the filling channels are used to branch off the potting compound flowing through the distributor channel out of the distributor channel and to conduct said potting compound from the distributor channel in a radial direction, in particular outward, to the respective magnet pockets, such that, for example, the potting compound flows through the distributor channel in a first direction and through the respective filling channel in a second direction, wherein the second direction runs obliquely or perpendicularly with respect to the first direction. The first direction runs for example parallel to the axial direction of the laminated core or coincides with the axial direction, wherein, for example, the second direction runs in the radial direction of the laminated core or coincides with the radial direction of the laminated core or of the rotor.

A second aspect concerns a method for producing a rotor for an electrical machine, in particular of a motor vehicle. In a first step of the method, at least one laminated core is provided which has a multiplicity of magnet pockets arranged in succession in the axial direction of the rotor and thus of the laminated core. In the second step of the method, at least one magnet is arranged in the respective magnet pocket. In the third step of the method, an in particular liquid potting compound is introduced into the magnet pockets, as a result of which the magnets are fixed in the magnet pockets by means of the potting compound.

A fourth step of the method may be provided that at least one distributor system extending in the laminated core is formed or produced. The distributor system has, for each magnet pocket, at least one filling channel fluidically connected to the respective magnet pocket. In addition, the distributor system has at least one distributor channel which is common to the filling channels and which is fluidically connected to the filling channels.

In a fifth step of the method, the magnet pockets are fluidically connected to one another via the distributor system. In a sixth step of the method, the liquid potting compound is introduced into the distributor system by virtue of the liquid potting compound being filled into the distributor channel and flowing continuously from the distributor channel into the respective filling channels and from the respective filling channels into the respective magnetic pockets which are fluidically connected to the distributor system.

The steps of the method need not necessarily be carried out in the stated sequence and may also be carried out in a different sequence.

Finally, the liquid potting compound may be filled vertically upward or downward into the distributor channel.

Furthermore, the distributor system may be ventilated vertically upward or downward via the abovementioned ventilation opening as the potting compound is filled into the distributor channel.

Further advantages, features and details of the invention will emerge from the following description of preferred exemplary embodiments and from the drawing. The features and combinations of features mentioned in the description above and the features and combinations of features mentioned in the description of the figures below and/or shown in the figures alone can be used not only in the respectively stated combination, but also in other combinations or alone without departing from the scope of the invention.

BRIEF DESCRIPTION OF THE DRAWINGS

The present disclosure will become more fully understood from the detailed description and the accompanying drawings, wherein.

DETAILED DESCRIPTION

In the figures, identical or functionally identical elements are denoted by the same reference designations.

Figure 1:
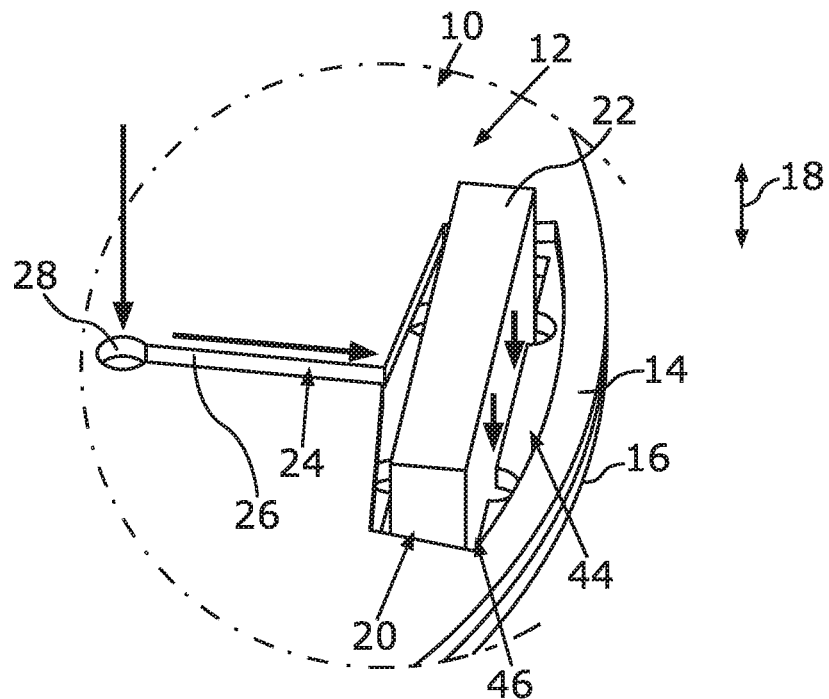
FIG. 1 shows a schematic perspective view of a detail of a rotor according to the invention according to a first embodiment.

FIG. 1 shows a schematic perspective view of a detail of a rotor 10 for an electrical machine, in particular of a motor vehicle such as for example a motor car, in particular a passenger motor car. In its fully produced state, the motor vehicle has, for example, a drivetrain by means of which the motor vehicle can be driven. In this case, for example, the electrical machine is part of the drivetrain, such that the motor vehicle, which is designed for example as an electric or hybrid vehicle, can be driven electrically by means of the electrical machine. The electrical machine is designed for example as a dynamoelectric machine and comprises a stator (not shown in the figures) and the rotor 10, which is for example rotatable about an axis of rotation relative to the stator.

The rotor 10 has at least one laminated core 12, which has a multiplicity of individual laminations arranged or stacked one on top of the other. Of these individual laminations, FIG. 1, which illustrates a first embodiment of the rotor 10, shows two individual laminations designated by 14 and 16. The individual laminations 14 and 16 are stacked one on top of the other along a stacking direction illustrated by a double-headed arrow 18 in FIG. 1, wherein the stacking direction coincides, for example, with the axial direction of the rotor 10. For example, the axial direction of the rotor 10 coincides with the stated axis of rotation.

The individual laminations 14 and 16 shown in FIG. 1, which are also referred to as rotor laminations, are immediately or directly adjacent to one another, such that the individual lamination 16 immediately or directly follows the individual lamination 14 in the axial direction of the rotor 10 or along the stacking direction, or vice versa.

The laminated core 12 also has a multiplicity of magnet pockets which are arranged in succession or one behind the other in the axial direction of the rotor 10, of which a magnet pocket designated by 20 is shown in FIG. 1. The magnet pocket 20 is also referred to as a holding pocket. A respective magnet 22, in particular in the form of a permanent magnet, is at least partially, in particular at least predominantly or entirely, received in the respective magnet pocket 20.

In order, for example, to be able to arrange the magnet 22 particularly easily in the magnet pocket 20, the magnet pocket 20 is formed so as to be larger at the inner circumference than the magnet 22 is at the outer circumference. In order to avoid undesired relative movements between the magnet 22 and the laminated core 12, a potting compound, which is not shown in any more detail in the figures, is introduced as illustrated by arrows in FIG. 1, by means of which potting compound the magnet 22 is fixed in the magnet pocket 20. In particular, the potting compound is introduced in the liquid state into the magnet pocket 20. The potting compound then cures, as a result of which the magnet 22 is held on the laminated core 12, and thereby fixed in the magnet pocket 20, by means of the cured potting compound.

In order to now be able to manufacture the rotor 10 in a simple and thus time-saving and cost-effective manner, the magnet pockets are fluidically connected to one another via at least one distributor system 24 formed in the laminated core 12. As can be seen from FIG. 1, the distributor system 24 has, for each magnet pocket that is fluidically connected to the distributor system 24, at least one filling channel 26 fluidically connected to the respective magnet pocket 20. Since multiple magnet pockets are provided, the distributor system 24 has multiple filling channels 26. The distributor system 24 furthermore has at least one distributor channel 28 which is common to the multiple filling channels 26 and which is fluidically connected to the respective filling channels 26.

As part of the production of the rotor 10, the potting compound is introduced into the magnet pockets in such a way that the liquid potting compound is filled or introduced into the distributor system 24. This takes place in such a way that the liquid potting compound is filled into the distributor channel 28 and flows continuously from the distributor channel 28 into the respective filling channels 26, which are fluidically connected to the distributor channel 28, and from the filling channels 26 into the respective magnet pockets, which are fluidically connected to the distributor system 24. The potting compound then cures, such that the cured potting compound extends continuously through the distributor system 24 from magnet pocket to magnet pocket and thereby forms a single-piece framework, which is also referred to as structure, clamping structure or lattice.

Figure 3:
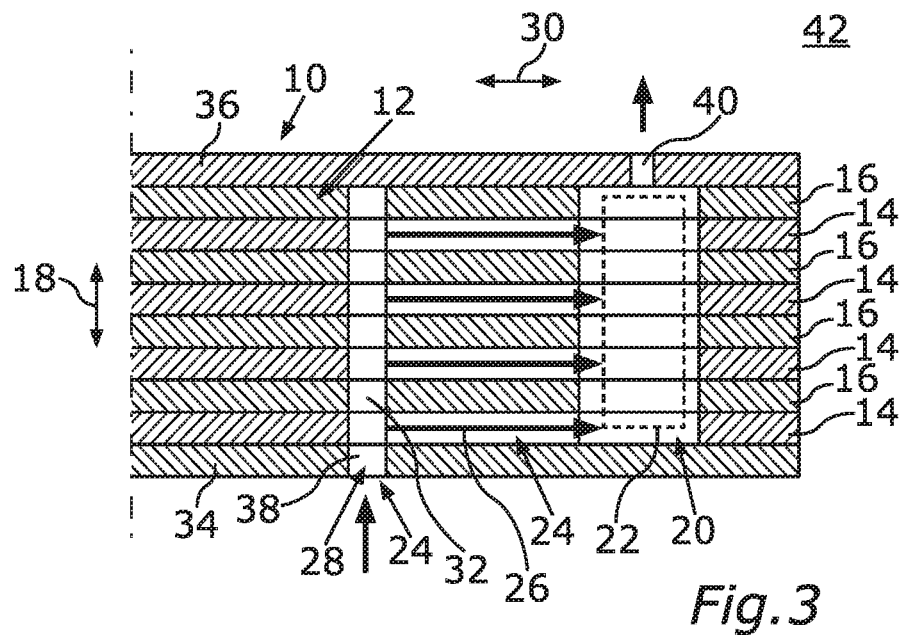
FIG. 3 shows a schematic sectional view of a detail of the rotor according to the first embodiment.

FIG. 3 shows a detail of the first embodiment of the rotor 10 in a schematic sectional view. In particular, it can be seen that the distributor channel 28 extends at least substantially in the axial direction (double-headed arrow 18) of the laminated core 12 or of the rotor 10. However, the respective filling channel 26 extends at least substantially in the radial direction of the rotor 10 and thus of the laminated core 12, wherein the radial direction is illustrated by a double-headed arrow 30 in FIG. 3. It can furthermore be seen particularly clearly from FIG. 3 that the distributor channel 28 is formed by respective openings 32, in particular in the form of through openings, of the individual laminations 14 and 16, in particular by virtue of the individual laminations 14 and 16 being stacked one on top of the other along the stacking direction such that the openings 32 overlap one another at least partially, in particular at least predominantly or entirely, and thereby form the distributor channel 28.

Furthermore, the respective filling channel 26 is formed by the respective individual lamination 14, wherein, for example, the respective individual lamination 16 has no filling channel. If, for example, the respective individual lamination 14 is arranged in the axial direction between in each case two individual laminations 16 that directly follow the respective individual lamination 14, the respective filling channel 26 is for example delimited in the axial direction on both sides by the respective individual laminations 16, in particular by the wall regions thereof. In this way, the potting compound flows in the liquid state in the axial direction through the distributor channel 28 and, by means of the respective filling channel 26, is branched off out of the distributor channel 28 and conducted or guided to or into the magnet pocket 20. Here, the potting compound flows through the distributor channel 28 at least substantially in the axial direction, and through the filling channel 26 at least substantially in the radial direction of the laminated core 12.

From FIG. 3 it can also be seen that the laminated core 12 is adjoined at both sides in the axial direction of the rotor 10 by respective end plates 34 and 36 of the rotor 10. Thus, the laminated core 12 is or the individual laminations 14 and 16 are arranged in the axial direction between the end plates 34 and 36. Here, for example, the individual laminations 14 and 16 or the laminated core 12 are clamped or pressed between the end plates 34 and 36, in particular in the axial direction.

Here, the end plate 34 has at least one filling opening 38 which is fluidically connected to the distributor system 24, in particular to the distributor channel 28, and via which the potting compound can be or is filled in its liquid state into the distributor system 24, in particular into the distributor channel 28.

In the first embodiment, the end plate 36, which is arranged on a side of the laminated core 12 which faces away from the end plate 34 in the axial direction of the rotor 10, has at least one ventilation opening 40 which is fluidically connected to the distributor system 24 and via which, in particular when the potting compound is filled into the distributor system 24 via the filling opening 38, air initially accommodated in the distributor system 24 and in the magnet pockets can escape from the magnet pockets and from the distributor system 24, in particular to the surroundings 42 of the rotor 10. As a result, the distributor system 24 and the magnet pockets are ventilated as the potting compound flows through the distributor system 24 and flows into the magnet pockets.

Figure 4:
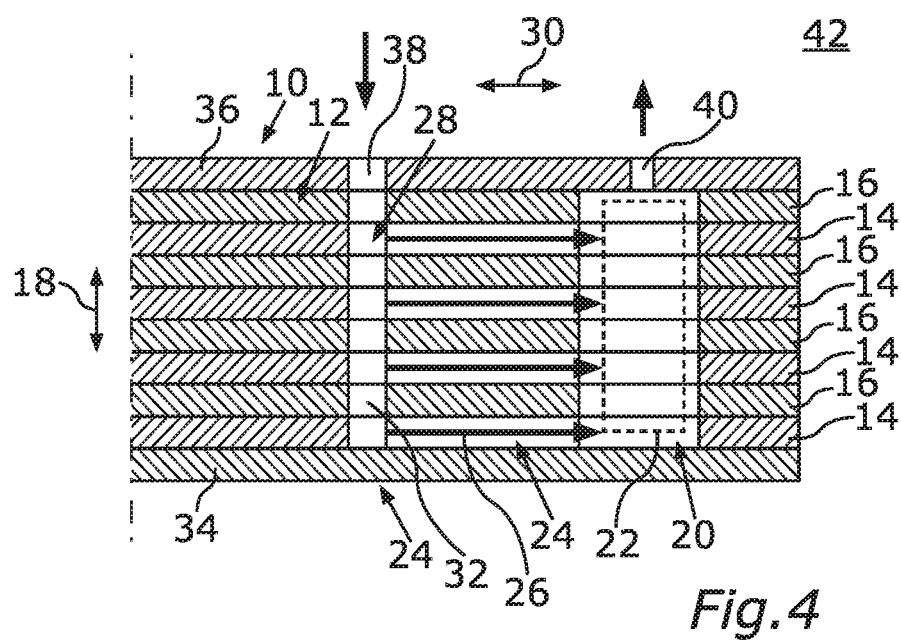
FIG. 4 shows a schematic sectional view of a detail of the rotor according to a second embodiment.

FIG. 4 illustrates a second embodiment in which the end plate 36 has both the ventilation opening 40 and the filling opening 38. As in the first embodiment, the end plate 34 delimits at least one of the filling channels 26 in the axial direction. In addition, in the second embodiment, provision is made whereby the end plate 34 delimits or closes the distributor channel 28 in the axial direction in order to thereby, for example, be able to feed the potting compound in a targeted manner and avoid undesired flows of the potting compound.

Figure 2:
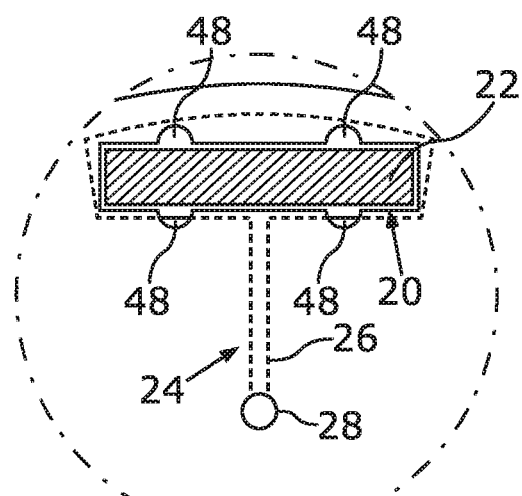
FIG. 2 shows a schematic plan view of a detail of the rotor according to the first embodiment.

It can be seen from FIGS. 1 and 2 that a first part 44 of the magnet pocket 20 is formed by the individual lamination 14 and a second part 46, which directly adjoins the first part 44 in the axial direction of the rotor 10, of the magnet pocket 20 is formed by the individual lamination 16, which directly adjoins the individual lamination 14 in the axial direction of the rotor 10, of the laminated core 12. Here, it is furthermore provided in the first embodiment that the respective parts 44 and 46 differ from one another in their shapes and/or inner circumferences and thereby form, for example, an undercut 49, which can be seen in FIG. 14, of the respective magnet pocket 20.

The filling opening 38 is, for example, a so-called gate point via which the liquid potting compound can be filled into the distributor system 24. The respective end plate 34 or 36 is also referred to as an end lamination, since the respective end plate 34 or 36 is formed, for example, from a lamination and thus from a metallic material. Here, the respective end plate 34 or 36 is arranged in a respective axial end region of the rotor 10. A plurality of filling openings 38 or gate points and/or a plurality of ventilation openings 40 are preferably provided. The filling opening 38 and/or the ventilation opening 40 and/or the respective opening 32 are formed, for example, as bores.

As can be seen from FIG. 3, a plurality of individual laminations 14 and 16 are provided, the number of which is greater than 2, wherein the plurality of individual laminations 14 and 16 form the respective parts 44 and 46 and are stacked one on top of the other in the axial direction such that the respective parts 44 and 46 form the magnet pocket 20. The respective part 44 or 46 is thus, for example, a recess formed in particular as a through-opening of the respective individual lamination 14 or 16, wherein the individual laminations 14 and 16 are stacked one on top of the other in such a way that the recesses overlap one another at least partially, in particular at least predominantly or entirely, and thereby form the re-spective magnet pocket such as the magnet pocket 20.

Since the respective part 44 or 46 is, for example, formed so as to be larger at the inner circumference side than the magnet 22 is at the outer circumference side, respective gaps or spaces are provided in the radial direction between the magnet 22 and the individual laminations 14 and 16 or the laminated core 12, into which gaps or spaces the potting compound is introduced or can flow.

The respective filling channel 26 is formed, for example, by an aperture, formed in particular as a through-opening, of the respective individual lamination 14, wherein the filling channel 26 is delimited on both sides in the axial direction of the rotor 10 by respective individual laminations 16 which immediately or directly adjoin the respective individual lamination 14 with the filling channel 26 in the axial direction.

In FIG. 2, by way of example, the filling channel 26 and the part 44 of the individual lamination 14 are shown by dashed lines. Furthermore, it can be seen from FIG. 2 that the magnet pocket 20, in particular the part 46, has at least one or more protuberances 48, which extend in particular in the radial direction of the rotor 10. As a result, for example, the potting compound can flow in a particularly effective manner from the part 44 to the respective subsequent part 46, such that the potting compound can distribute in the magnet pocket 20.

The parts 44 and 46 are thus respective pocket geometries which, in the first embodiment, are embodied in different designs or geometries and sizes. Here, the part 44 is assigned the filling channel 26, while the individual lamination 16 has no filling channel, such that the part 46 is not assigned a filling channel. In this way, the respective individual laminations 16 adjoining the individual lamination 14 on both sides in the axial direction can delimit or close the filling channel 26 on both sides in the axial direction.

The fixing of the magnets in the magnet pockets performed in the manner described is also referred to as potting, wherein the potting compound is also referred to as potting. During the potting process, the potting passes from the distributor channel 28 via the respective filling channels 26 into the respective magnet pocket, the respective magnet pocket being dimensioned to be larger than the respective filling channel 26. In the magnet pocket 20, the potting compound, also referred to as filler material, flows around the magnet 22 and passes for example from the part 44 into the part 46, and fills a space there, via the stated gap, which in particular encircles the magnet 22, between the magnet 22 and the laminated core 12.

The aforementioned variation of the pocket geometry gives rise, as viewed in the stacking direction, to undercuts, depressions, protuberances, incisions, etc. in the respective magnet pocket 20, which is also referred to as a cavity, which undercuts, depressions, protuberances, incisions, etc. lead, during the filling of the cavity with the potting compound, after the curing thereof, to a connection, in particular a positively locking and/or cohesive connection, of the individual laminations 14 and 16, stacked one on top of the other, to one another.

It can be seen from FIG. 3 that, in the first embodiment, provision is made whereby the potting compound is introduced or guided into the distributor system 24 in the vertical direction from below. Furthermore, it is provided in the first embodiment that the distributor system and the magnet pockets are ventilated upward in the vertical direction. Thus, for example, the potting compound is introduced into the distributor system 24 while the rotor 10 is set up vertically, such that the axial direction of the rotor runs in the vertical direction or coincides with the vertical direction.

In the embodiment illustrated in FIG. 4, the potting compound is introduced into the distributor system 24 in the vertical direction from top to bottom. Furthermore, the distributor system 24 and the magnet pockets are ventilated in a vertical direction from bottom to top.

Figure 5:
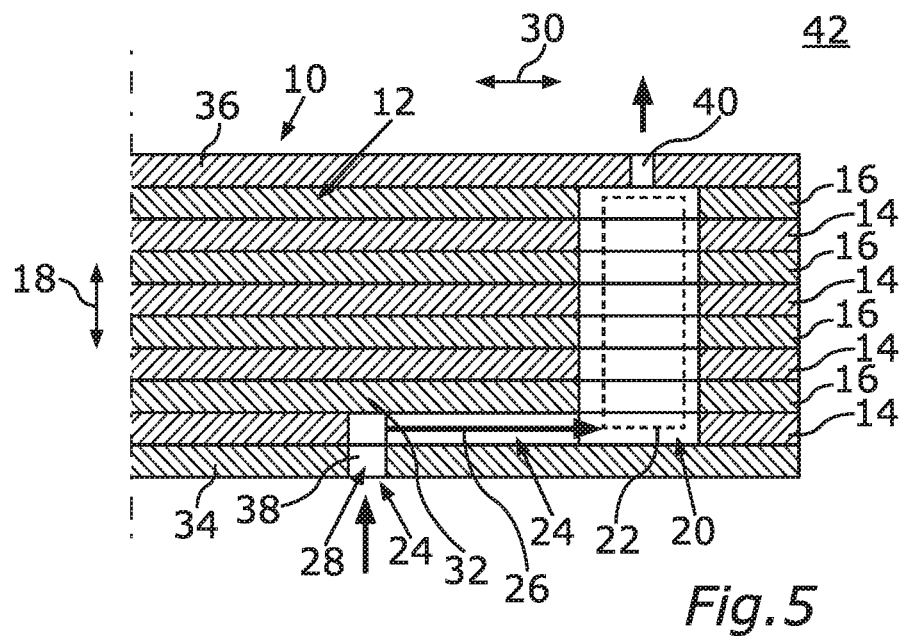
FIG. 5 shows a schematic sectional view of a detail of the rotor according to a third embodiment.

FIG. 5 illustrates a third embodiment. While several filling channels 26 are provided for each magnet pocket in the second and in the first embodiment, exactly one filling channel 26 is provided for each magnet pocket in the third embodiment.

Figure 6:
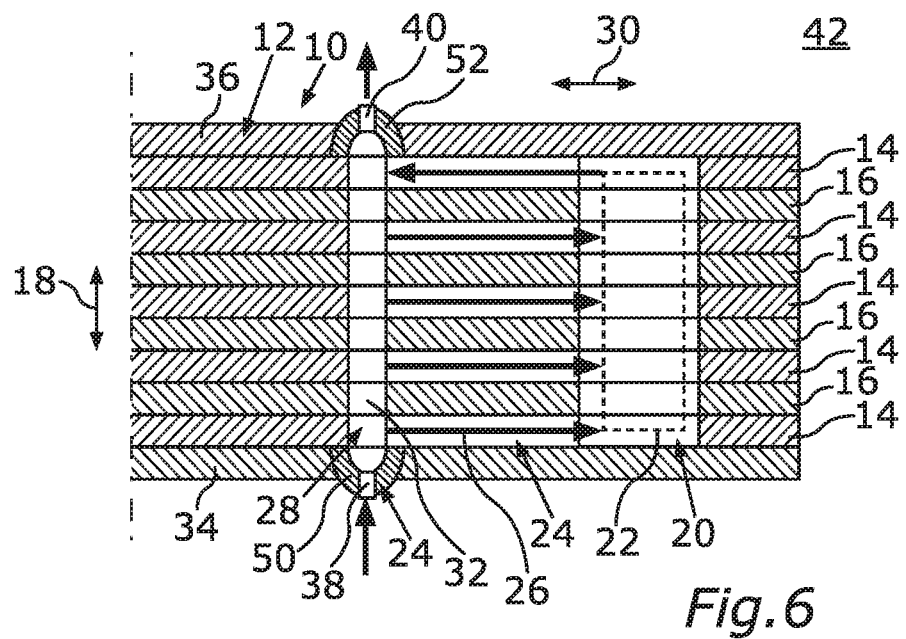
FIG. 6 shows a schematic sectional view of a detail of the rotor according to a fourth embodiment.

FIG. 6 shows a fourth embodiment, in which the respective end plate 34 or 36 has at least one encircling bead 50 or 52 respectively. The filling opening 38 is formed in the bead 50, wherein the ventilation opening 40 is formed in the bead 52.

While it is the case in the first, second and third embodiment that the filling opening 38 and the ventilation opening 40 are arranged in an axially offset manner with respect to one another or so as to be staggered with respect to one another such that the filling opening 38 and the ventilation opening 40 do not overlap or cover one another, the filling opening 38 and the ventilation opening 40 are arranged coaxially or so as to cover or overlap one another in the case of the fourth embodiment.

Figure 7:
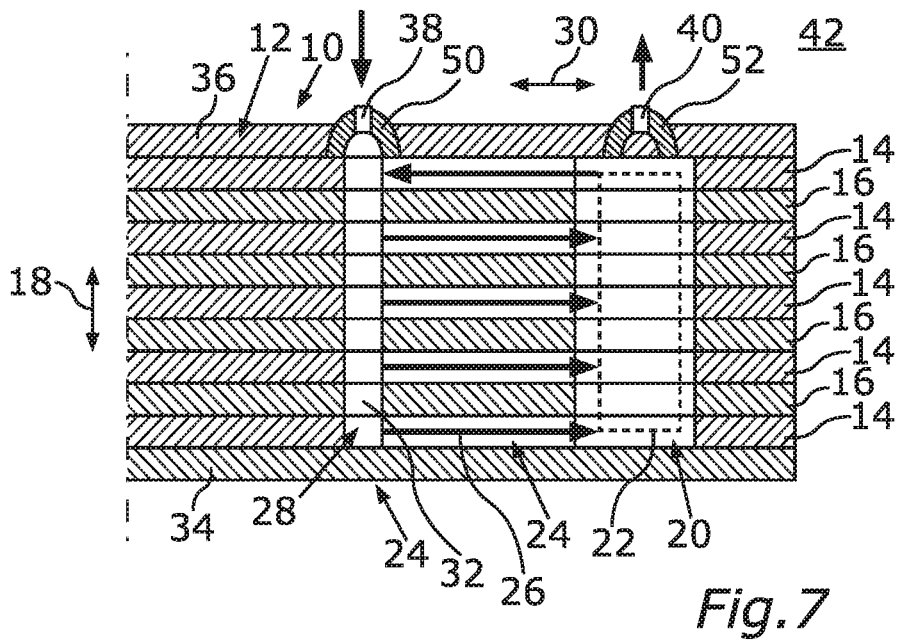
FIG. 7 shows a schematic sectional view of a detail of the rotor according to a fifth embodiment.

FIG. 7 shows a fifth embodiment, in which the end plate 36 has the bead 50 with the filling opening 38 and the bead 53 with the ventilation opening 40. The bead 50 and/or 52 is designed, for example, as an encircling bead.

Figure 8:
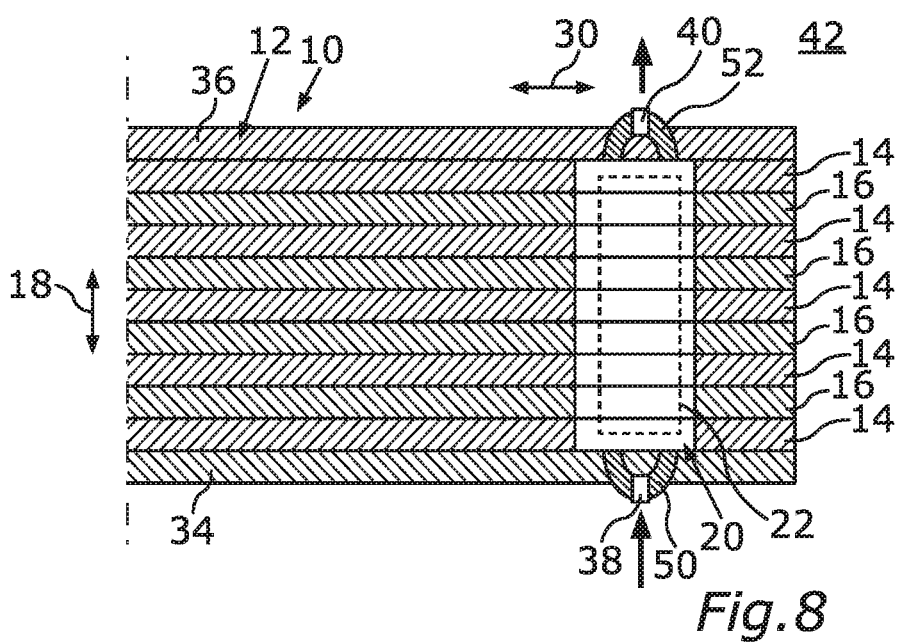
FIG. 8 shows a schematic sectional view of a detail of a rotor, wherein FIG. 8 serves for the explanation of the background of the invention.

FIG. 8 shows, in a schematic sectional view, a detail of a rotor 10 in which neither a filling channel nor a distributor channel is provided.

Figure 9:
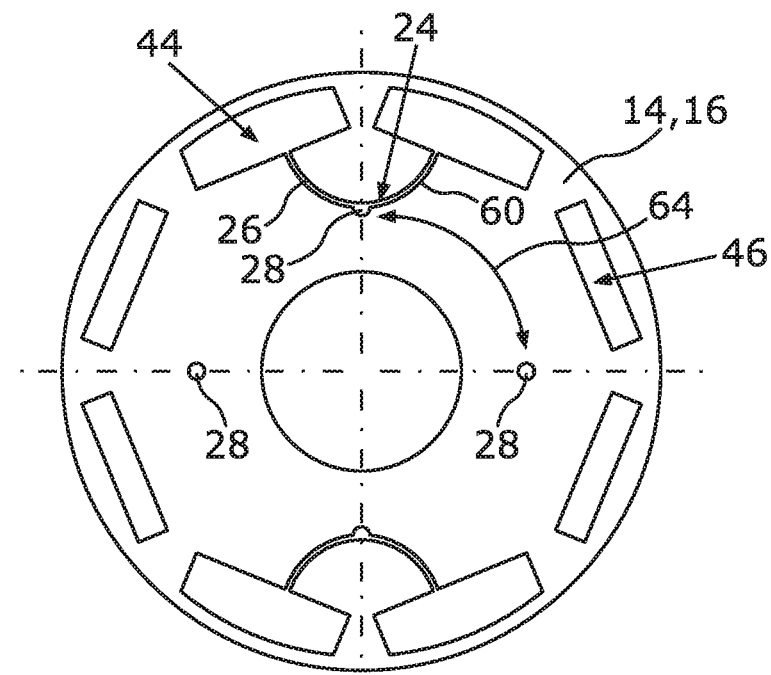
FIG. 9 shows a schematic plan view of an individual lamination of the rotor according to a sixth embodiment.
Figure 10:
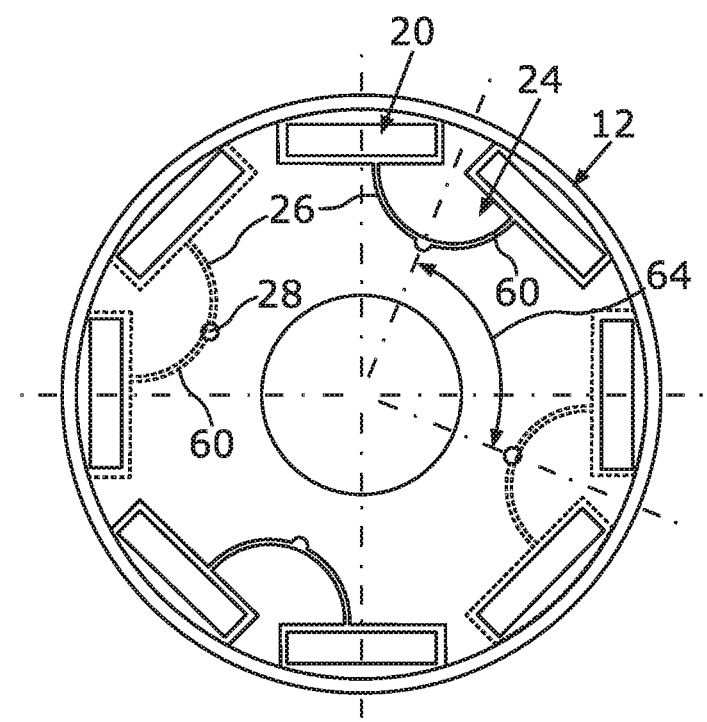
FIG. 10 shows a schematic plan view of a laminated core of the rotor according to the sixth embodiment.

A sixth embodiment of the rotor 10 is illustrated on the basis of FIGS. 9 and 10. In the sixth embodiment, the individual laminations 14 and 16 are formed by identical lamination blanks, such that the individual laminations 14 and 16 are of identical or similar construction. The respective individual lamination 14 or 16 forms both the respective parts 44 and the respective parts 46. The individual laminations 14 and 16 are arranged so as to be rotationally staggered with respect to one another in the circumferential direction of the rotor 10, in particular in such a way that, for example, the respective part 44 comes to rest on the respectively associated part 46 or vice versa. In particular, the individual laminations 14 and 16 are arranged so as to be rotationally staggered by 90 degrees with respect to one another in the circumferential direction of the laminated core 12, as a result of which the respective magnet pocket is formed by the different parts 44 and 46, but the laminated core 12 has only the same or identical individual laminations 14 and 16.

In the sixth embodiment, it is thus provided that the respective magnet pocket in the laminated core 12 is produced by rotating the same individual laminations 14 and 16 or else groups of similar individual laminations 14 and 16, such that the individual laminations 14 and 16 are not only stacked one on top of the other but also can be rotationally staggered with respect to one another in the circumferential direction of the laminated core 12. For this purpose, for example, rotationally symmetrically arranged recesses for the respective magnet pocket are formed in different sizes in each individual lamination 14 or 16. During the stacking process, the individual laminations 14 and 16 or else groups of similar individual laminations 14 and 16 are then placed one on top of the other in each case in a rotationally staggered manner, wherein the recesses of different sizes in each case overlap one another. In particular, it is possible that the recesses of the respective magnet pocket which are brought into overlap with one another differ from one another not or not only in terms of their size but also in terms of their shape.

Figure 11:
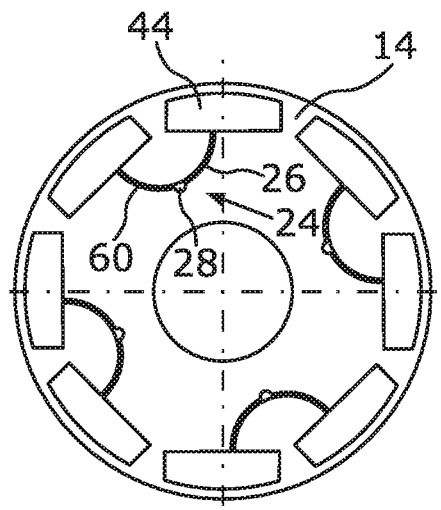
FIG. 11 shows a schematic plan view of an individual lamination of the rotor according to a seventh embodiment.
Figure 12:
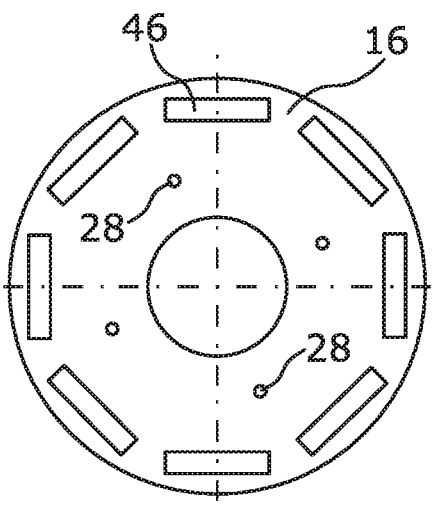
FIG. 12 shows a schematic plan view of a second individual lamination of the rotor according to the seventh embodiment.

FIGS. 11 and 12 illustrate a seventh embodiment in which the individual laminations 14 and 16 are formed by lamination blanks which are different from one another. In the seventh embodiment, at least two types of individual laminations are thus provided. The individual lamination 14 belongs to a first of the types, while the individual lamination 16 belongs to the second type. Here, the recesses in the individual laminations 14 and 16 substantially overlap one another. While the recesses of the individual lamination 14 are the same, the recesses of the individual lamination 16 are the same. However, the recesses of the individual lamination 16 differ from the recesses of the individual lamination 14 in particular with regard to their shape and/or with regard to their inner circumference, as a result of which the respective magnet pocket with the mutually different parts 44 and 46 is formed by stacking the individual laminations 14 and 16 one on top of the other. In other words, the two types of individual laminations are stacked alternately one on top of the other along the stacking direction or stacked alternately one on top of the other in small stacks of similar individual laminations.

From FIGS. 9 to 12, it can for example be seen that the magnet pockets to which the magnet pocket 20 belongs are also referred to as first magnet pockets and form a first pocket group 54. It can be seen particularly clearly in conjunction with FIG. 13, which illustrates the sixth embodiment, that the laminated core 12 thus has the first pocket group 54 and also a second pocket group 56. For the sake of simplicity, the magnet pockets of the first pocket group 54 are for example referred to as first magnet pockets 20. The second pocket group 56 is arranged adjacent to the first pocket group 54 in the circumferential direction of the laminated core 12 and comprises a multiplicity of second magnet pockets 58 which are arranged in succession in the axial direction of the rotor 10 and to which the statements above and below regarding the first magnet pockets 20 can be transferred, and vice versa. In the second magnet pockets 58, too, there are received respective second magnets, which are fixed in the second magnet pockets 58 by means of the cured potting compound.

Here, the second magnet pockets 58 are fluidically connected to one another via the distributor system 24 and, for example, fluidically to the first magnet pockets. Here, the distributor system 24, for each second magnet pocket 58, has at least one second filling channel 60 fluidically connected to the respective second magnet pocket 58 and has the at least one distributor channel 28 which is common to the first filling channels 26 and the second filling channels 60 and which is fluidically connected to the filling channels 26 and 60. Here, the cured potting compound extends continuously through the distributor system 24 from magnet pocket 20 and 58 to magnet pocket 20 and 58, such that the potting compound, as it is filled into the magnet pockets 20 and 58, can flow from the distributor channel 28 not only into the magnet pockets 20 via the filling channels 26 but also into the magnet pockets 58 via the filling channels 60.

Overall, it can be seen that the rotor 10 is based on the concept that the potting compound for the potting of the magnets 22 or of the magnet pockets 20 and 58 does not have to be filled into each individual magnet pocket, but can rather distribute into the individual magnet pockets 20 and 58 via the respective end plate 34 or 36, the distributor channel and the filling channels 26 and 60. Such potting of the magnet pockets 20 and 58 by means of the distributor system 24 can be performed in automated fashion, as a result of which the manufacturing outlay can be kept low. In particular, it is possible to feed the potting compound to the laminated core 12 laterally with respect to the magnet pockets 20 and 58 via the stated gate points. Air enclosed in the magnet pockets 20 and 58 and in the distributor system 24 can be discharged upward or downward and thus ventilated. It is also possible to use a highly viscous potting compound as the potting compound. Furthermore, it is possible to fill the spaces between the laminated core 12 and the magnets 22 simultaneously and quickly with the potting compound. A lateral escape from the laminated core 12 and bubble formation are at least virtually entirely prevented.

The respective gate point may be arranged in the respective end plate. In general, the respective gate point is accessible axially. The number of gate points may be determined as required, though may be dependent on the number of magnet pockets. However, the number of gate points is generally greater than 2.

As part of a method for producing the rotor 10, it is provided in particular that the laminated core 12 is firstly produced with the respective magnet pockets, in particular from the individual laminations 14 and 16, which are also referred to as electrical laminations. Furthermore, the end plates are arranged, for example, on respective end sides of the laminated core 12. Here, the end plates are either closed or are each formed with at least one filling opening 38 and/or one ventilation opening 40. The laminated core 12 and the end plates 34 and 36 (end laminations) form, for example, a structural unit which is fixed by means of a device or in the device. The device presses the laminated core 12 or the structural unit in the axial direction and seals off the laminated core 12, in particular the structural unit.

The potting compound is thereupon filled into the distributor system 24 in the manner described, in particular by means of a filling device. In particular, the potting compound is filled into the distributor system 24 under pressure, such that the potting compound flows laterally into the magnet pockets 20 and 58 through the distributor channel 28 and the filling channels 26 and 60 respectively. The potting compound can be simultaneously pressed from below in the direction of the respective other end side, in particular in the direction of the ventilation opening 40. The potting compound then cures.

The potting compound may be introduced in an inviscid to viscous form into the distributor system 24 or into the magnet pockets 20 or 58. The distribution of the introduced potting compound can be assisted here by gravity, vibration and/or by mechanical shocks. However, the potting compound is preferably pressed into the magnet pockets 20 and 58. Adequate filling of transverse spaces that are present, or of the distributor system 24 and of the magnet pockets 20 and 58, is achieved in a simple manner by the pressing-in action.

In a further embodiment, the distributor system 24 and/or the magnet pockets 20 are filled with the potting compound by foaming. In other words, for example, the introduced potting compound cures while undergoing a volume expansion.

A thermoplastic may used as the potting compound. Such a thermoplastic allows it to be introduced into the distributor system 24 or into the magnet pockets 20 and 58 by means of extrusion. In this case, the for example heated and liquefied potting compound is injected under pressure into the distributor system 24 or into the magnet pockets 20 and 58 by means of at least one nozzle or the like. The potting compound subsequently cures by cooling. Alternatively, a curing resin system may be used as the potting compound.

Figure 14:
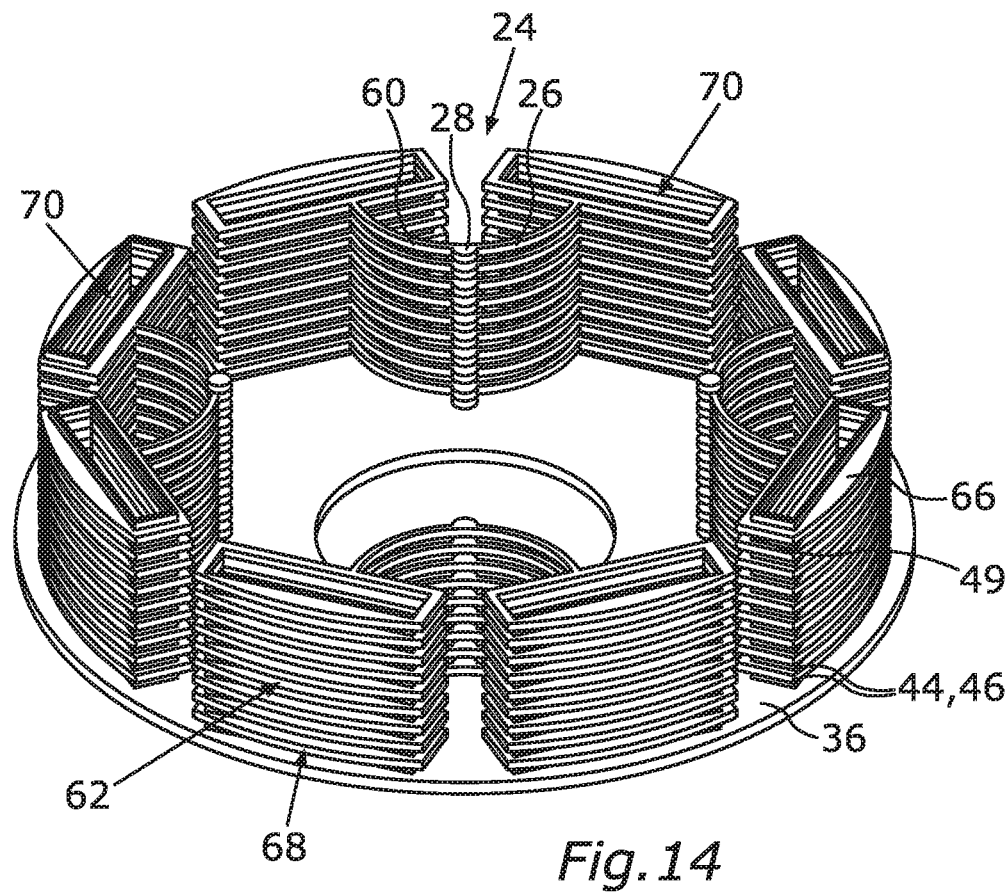
FIG. 14 shows a schematic perspective view of a detail of the rotor according to the seventh embodiment.
Figure 15:
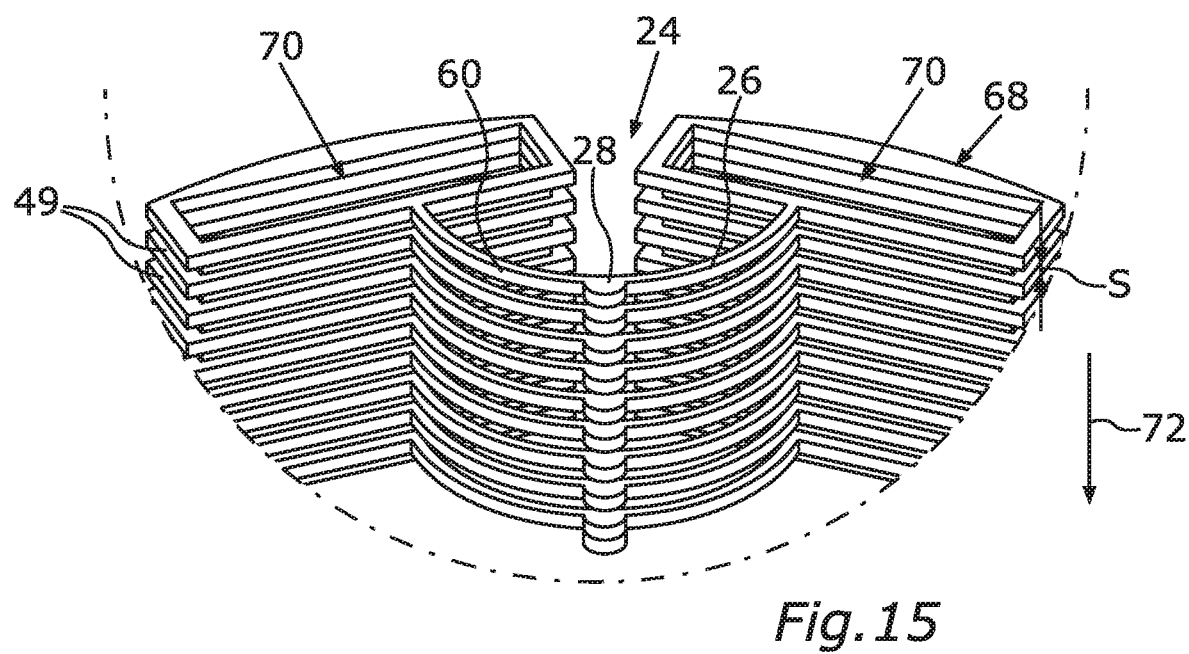
FIG. 15 shows a further schematic perspective view of a detail of the rotor according to the seventh embodiment.

FIGS. 14 and 15 illustrate a seventh embodiment of the rotor 10. As can be seen from FIGS. 14 and 15, the cured potting compound forms the at least one framework, designated by 62 in FIGS. 14 and 15, which is also referred to as structure, clamping structure or lattice.

In particular, the potting compound forms, for example, a framework for each pocket group 54 or 56. Since, for example, the pocket groups 54 and 56 are fluidically connected to one another via the distributor system 24, the pocket groups 54 and 56 form a group arrangement. In other words, such a group arrangement comprises pocket groups which are fluidically connected to one another via the distributor system 24. Here, for example, the potting compound forms a framework 62 for each group arrangement.

In the seventh embodiment, four group arrangements and accordingly four frameworks 62 are provided. The respective frame 62 is a single-piece component formed by the cured potting compound, which component is used to fix the magnets 22 in the magnet pockets 20 and 58. In particular, by means of the stated undercut 49, the individual laminations 14 and 16 are also connected together or to one another by means of the framework 62. Furthermore, the framework 62 has a damping function, such that excessive vibrations and resulting noises can be prevented for example during operation of the electrical machine. The framework 62 is a clamping structure for fixing the magnets 22 in the magnet pockets 20 and 58.

The introduction of the additional clamping structure into the laminated core 12 is suitable for mass production and can be easily integrated into conventional production processes by means of multiple stamping, pressing and cutting steps. The clamping structure is realized, for example, by means of the method for producing the laminated core 12, wherein the individual laminations 14 and 16 are produced with their respective at least one recess of predetermined contour and are stacked one on top of the other in such a way that, by means of the respective recesses, at least one cavity which is open at least on one side, in particular in the form of the respective magnet pocket 20 or 58, is formed in the stacking direction, the transverse extent of which at least one cavity varies along the stacking direction.

In the manner described, the cavity is filled, in particular filled out, with the potting compound which constitutes a curable filler material, whereupon the filler material cures or is cured. Consequently, for example, the individual laminations 14 and 16 are joined to one another by positive locking and/or cohesion, in particular by means of the framework 62.

To form the respective cavity, it is not imperatively necessary to form additional recesses in the individual laminations 14 and 16. Rather, for the above-described technique, it is in principle possible to use existing recesses of the individual laminations 14 and 16. In the simplest case, the recesses formed for example by punching or by another deformation method already inherently have a transverse extent that varies in the stator direction. For example, the wall of such a recess may have a convex or concave shape as a result of a punching process owing to the tool used. If the individual laminations 14 and 16 are then stacked with their recesses on top of one another, the resulting cavity inevitably already has, in the stator direction, the variable transverse extent necessary for positive locking.

In particular, a distributor system 24 is provided for each group arrangement, such that, for example, multiple distributor channels 28 are provided, in particular so as to be spaced apart from one another in the circumferential direction of the laminated core 12. Here, it can be seen from FIG. 9, and is illustrated by means of a double-headed arrow 64, that for example four distributor channels 28 are provided in the sixth embodiment and in the seventh embodiment, which distributor channels are arranged in pairs so as to be staggered by 90 degrees with respect to one another in the circumferential direction of the laminated core 12.

The respective distributor channel 28 is formed—as described above with reference to the respective opening 32—by respective openings which are arranged one on top of the other in the stacking direction or in the axial direction and which overlap one another, in particular in the form of through openings of the respective individual laminations 14 and 16. It can be seen particularly clearly from FIG. 9 that the part 44 is a first pocket geometry with the filling channel 26 or 60, whereas, for example, the second part 46 is a pocket geometry without filling channel.

Figure 13:
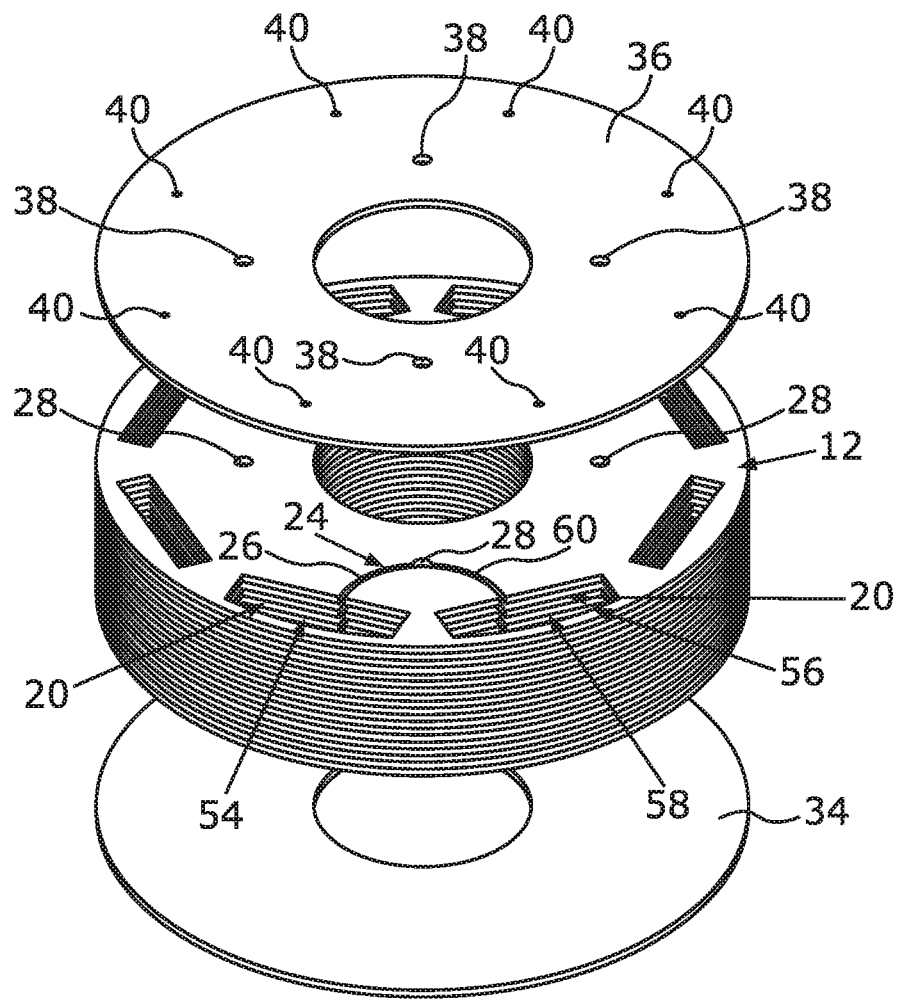
FIG. 13 shows a schematic exploded view of a detail of the rotor according to the sixth embodiment.

It can be seen from FIG. 13, for example, that at least one filling opening 38 and at least one ventilation opening 40 are provided for each distributor system 24. In the sixth embodiment, two ventilation openings 40 are provided for each distributor system 24. Here, the end plate 36 forms both the ventilation openings 40 and the filling opening 38, such that the end plate 34 is formed as a closed end plate, in particular as a closed end lamination.

It can be seen from FIG. 14 that, for example, a protuberance 66 of the potting compound can be produced by means of the part 44. Since the respective framework 62 which is formed by the potting compound can be seen in FIG. 14, the potting compound is designated by 68 in FIG. 14. Here, the framework 62 forms respective through openings 70 for the magnets 22. In addition, the thickness s of the framework 62 running in the axial direction is illustrated in FIG. 15, wherein the thickness s corresponds to the integer multiple of the lamination thickness of the respective individual lamination 14 or 16. In addition, an arrow 72 in FIG. 15 illustrates the stacking direction of the laminated core 12.

Figure 16:
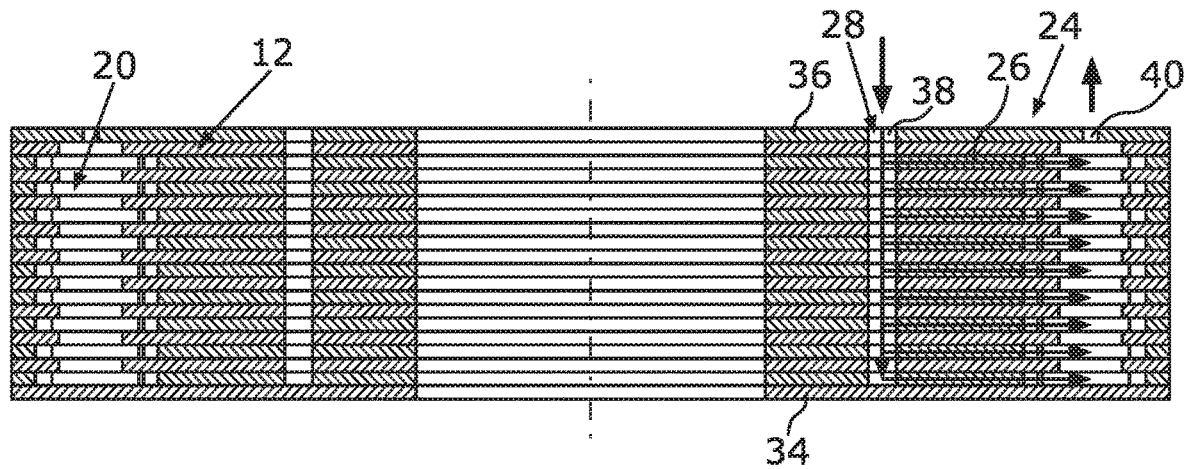
FIG. 16 shows a schematic sectional view of a laminated core of the rotor according to the second embodiment.
Figure 17:
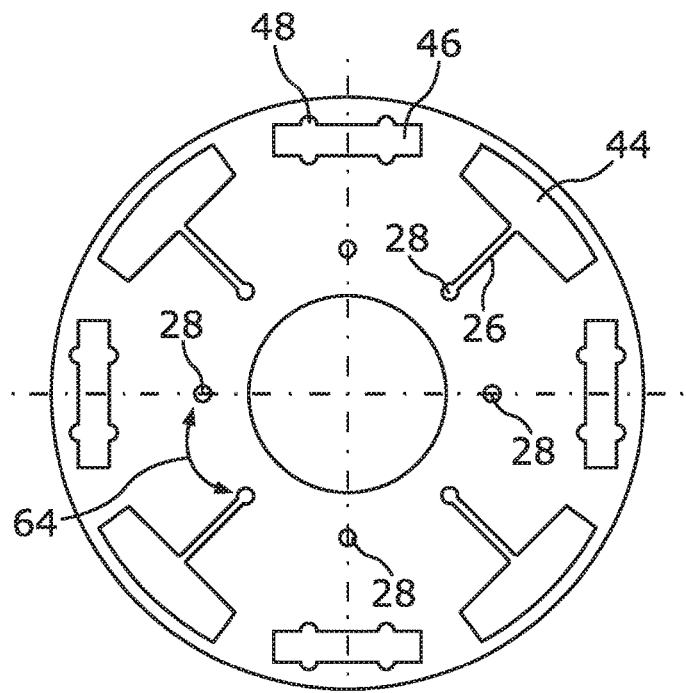
FIG. 17 shows a schematic plan view of an individual lamination of the rotor according to the first embodiment.
Figure 18:
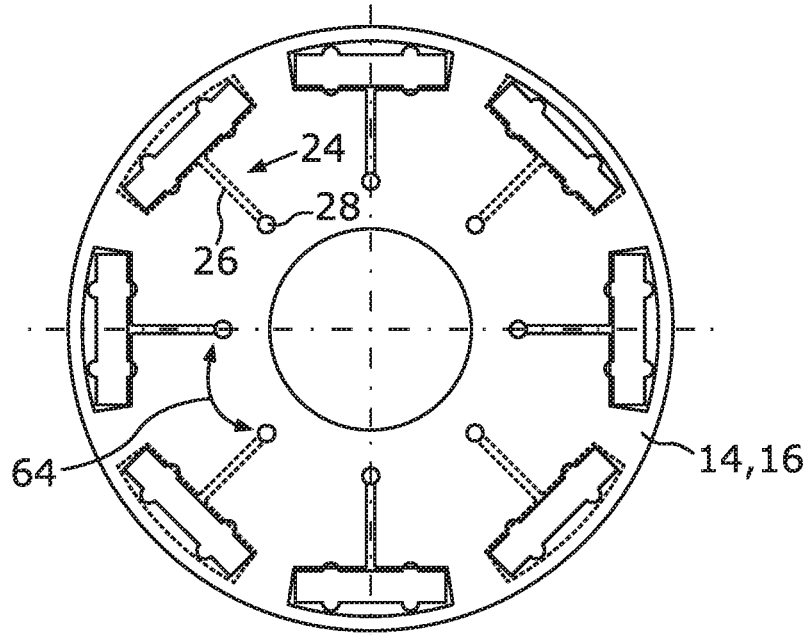
FIG. 18 shows a schematic plan view of the laminated core of the rotor according to the first embodiment.
Figure 19:
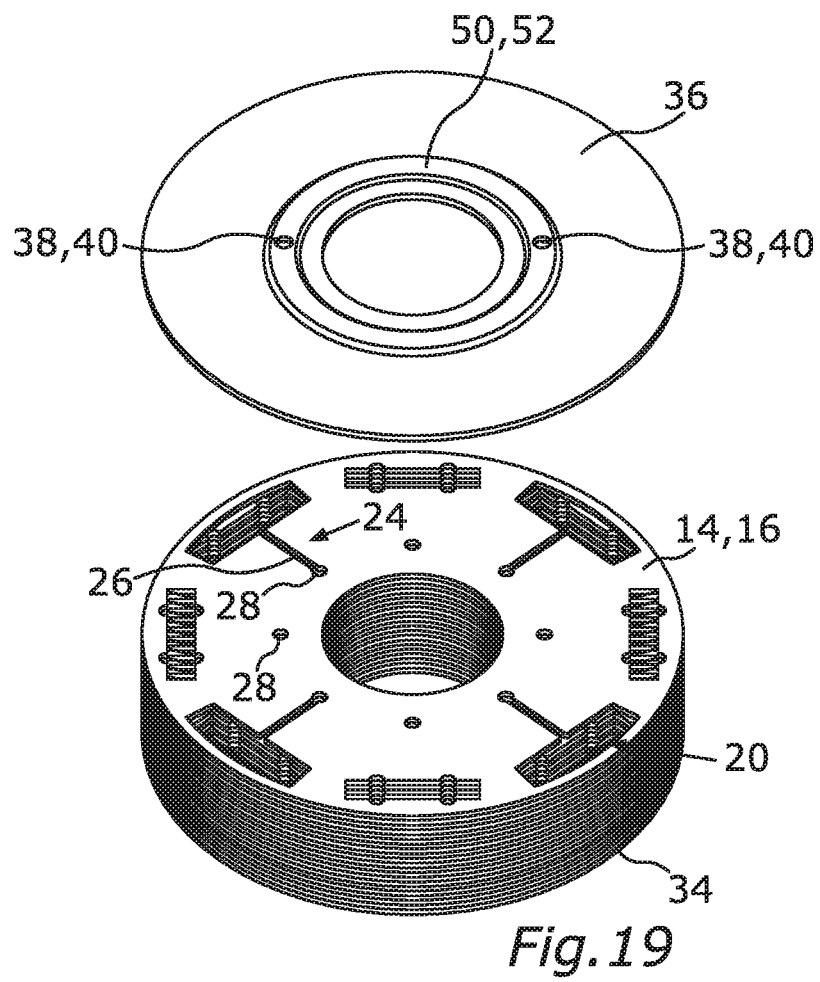
FIG. 19 shows a schematic exploded view of a detail of the rotor according to the first embodiment.

FIG. 16 shows the laminated core 12 according to the second embodiment in a schematic sectional view.

FIGS. 17 to 22 further illustrate the first embodiment. Whereas it is for example the case in the sixth embodiment illustrated in FIG. 9 that the distributor channels 28 are spaced apart from one another in pairs by 90 degrees in the circumferential direction of the laminated core 12, the distributor channels 28 in the first embodiment are spaced apart from one another in pairs by 45 degrees in the circumferential direction of the laminated core 12.

In the first embodiment, for example, no group arrangements are provided, such that, for example, in the first embodiment, the respective pocket groups 54 and 56 are not fluidically connected to one another. Here, a distributor channel 28 is provided for each pocket group, such that eight distributor channels 28 are provided in the case of eight pocket groups.

Figure 20:
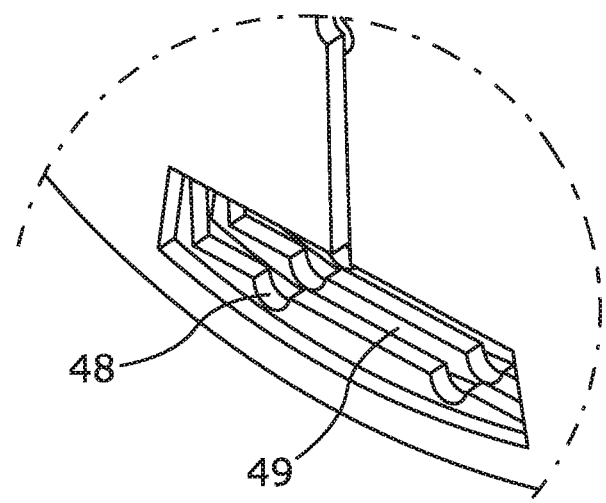
FIG. 20 shows a schematic perspective view of a detail of the laminated core of the rotor according to the first embodiment.
Figure 21:
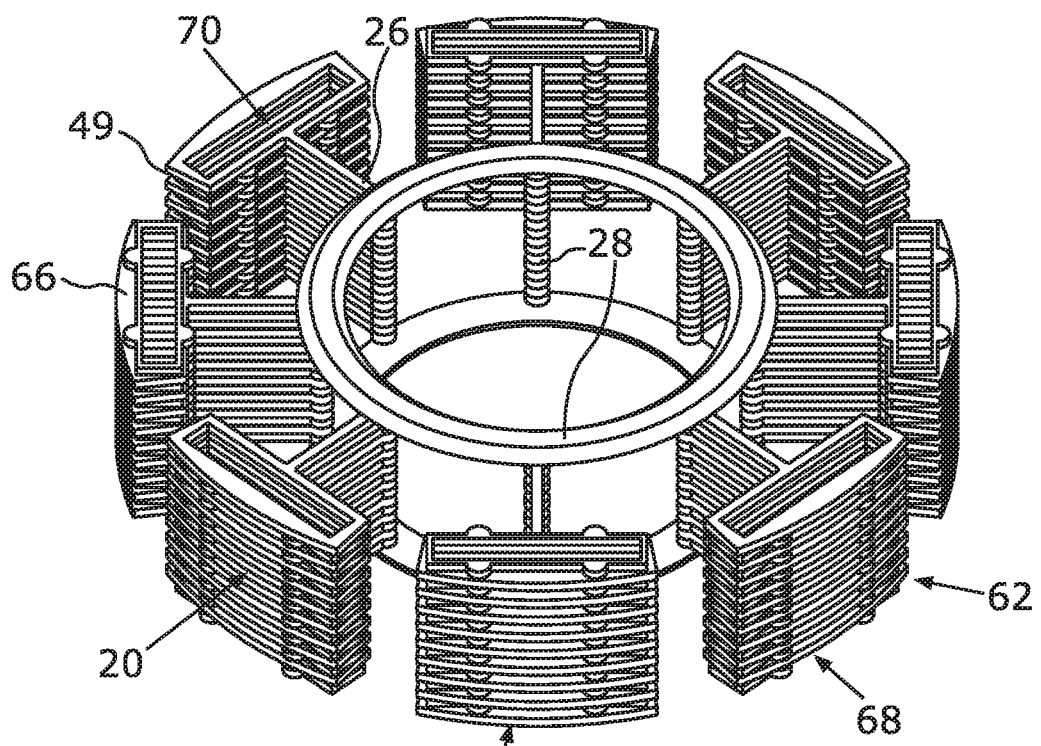
FIG. 21 shows a schematic perspective view of a framework, formed by a potting compound, of the rotor according to the first embodiment.
Figure 22:
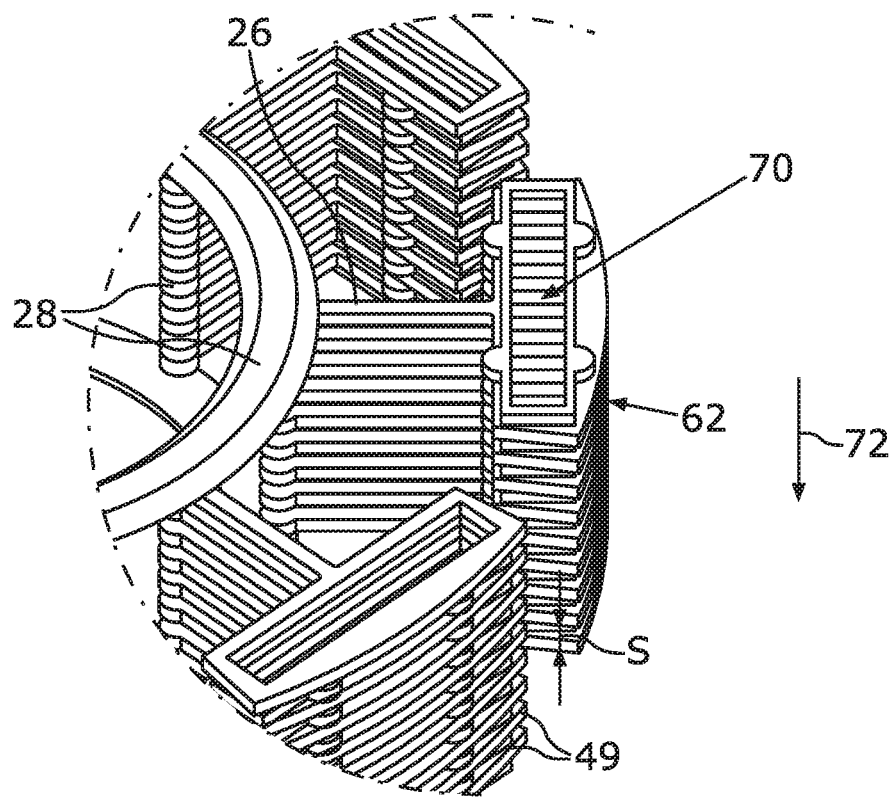
FIG. 22 shows a schematic perspective view of a detail of the framework of the rotor according to the first embodiment.

It can be seen from FIG. 20 that the protuberance 48 is an extension geometry of the respective magnet pocket 20 or of the part 46. In addition, the respective undercut 49 can be seen from FIG. 20. The framework 62 in the first embodiment can be seen from FIGS. 21 and 22.

Figure 23:
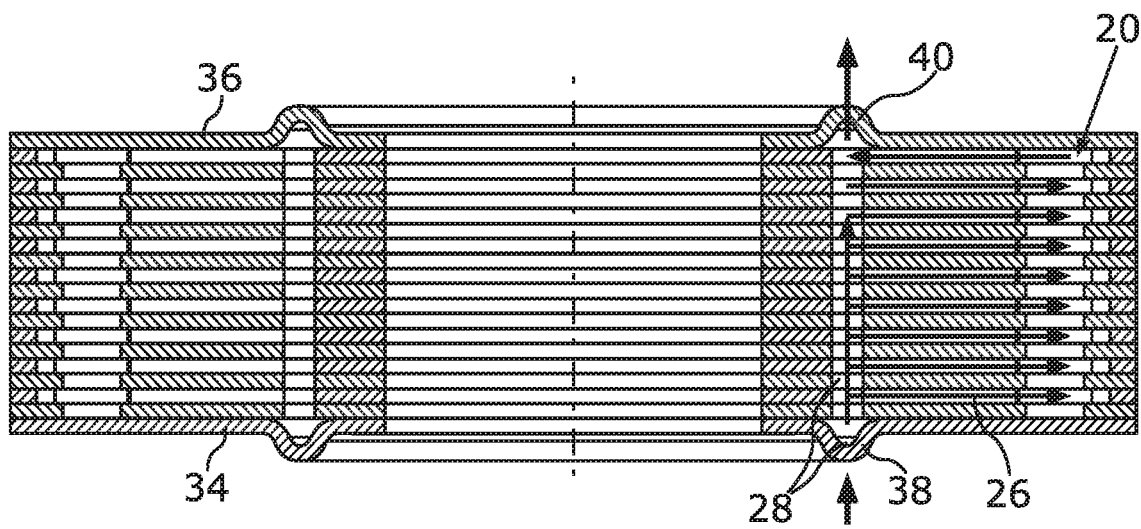
FIG. 23 shows a schematic sectional view of the laminated core of the rotor according to an eighth embodiment.

Finally, FIG. 23 shows an eighth embodiment. The previous statements relating to the laminated core 12 as a whole can also be transferred to respective laminated cores with respective end laminations designed as partial laminated cores. If, for example, the laminated core 12 is made up overall of several partial laminated cores, in particular with incremental offsetting, then it is for example the case that the partial laminated cores with end plates and inserted magnets are firstly manufactured and welded. The laminated core 12 is then produced as a whole by stacking the partial laminated cores with incremental offsetting, whereupon the magnets are potted, or fixed in the magnet pockets, in the described manner.

The potting of the magnets is alternatively possible in the incrementally offset laminated core, assembled from partial laminated cores, of the rotor 10. For this purpose, the respective inner end laminations of the partial laminated cores each have slots lying on a pitch circle, which slots can be seen for example from FIGS. 25 and 26 and are designated there by 74. Thus, the magnet pockets of the offset partial laminated cores are in each case fluidically connected to one another via the end laminations directly or indirectly via the distributor channels 28 and form a cavity that extends through the entire laminated core, such that the magnets can be potted with the potting compound.

Figure 24A:
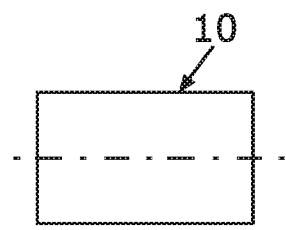
FIGS. 24a-c each show schematic illustrations for the purposes of illustrating an offset of the rotor.
Figure 24B:
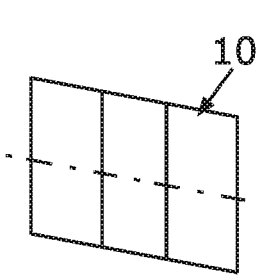
Figure 24C:
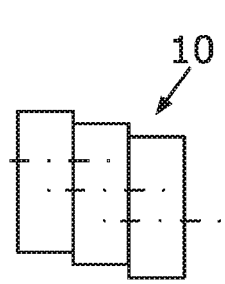

An electrical machine with internal magnets, in particular permanent magnets, generally comprises a rotor which has a multiplicity of magnets with alternating polarity around the outer circumference of the rotor. The rotor can rotate within the stator, which generally comprises a large number of windings and magnet poles of alternating polarity. The configuration of magnets in electrical machines with internal permanent magnets is conventionally radially symmetrical, that is to say it exhibits symmetry with respect to the origin. This is illustrated for example in FIG. 24a, in which a rotor 10 without offsetting of the magnets and magnet pockets is shown. Permanent magnet machines can generate an undesired torque ripple, which can lead to undesired vibrations and noises. Conventionally, the magnets in the rotor are therefore offset in a skewed manner in order to reduce the torque ripple, for example by virtue of the magnets being placed at an axial angle relative to one another and the magnets being incrementally rotated. This is also known as offsetting or skewing, wherein offsetting is used to reduce harmonics, cogging torques, so-called torque ripple and noise. Here, FIG. 24b illustrates a rotor 10 with a continuous skew, whereas FIG. 24c illustrates a rotor 10 with incremental offsetting.

Figure 25:
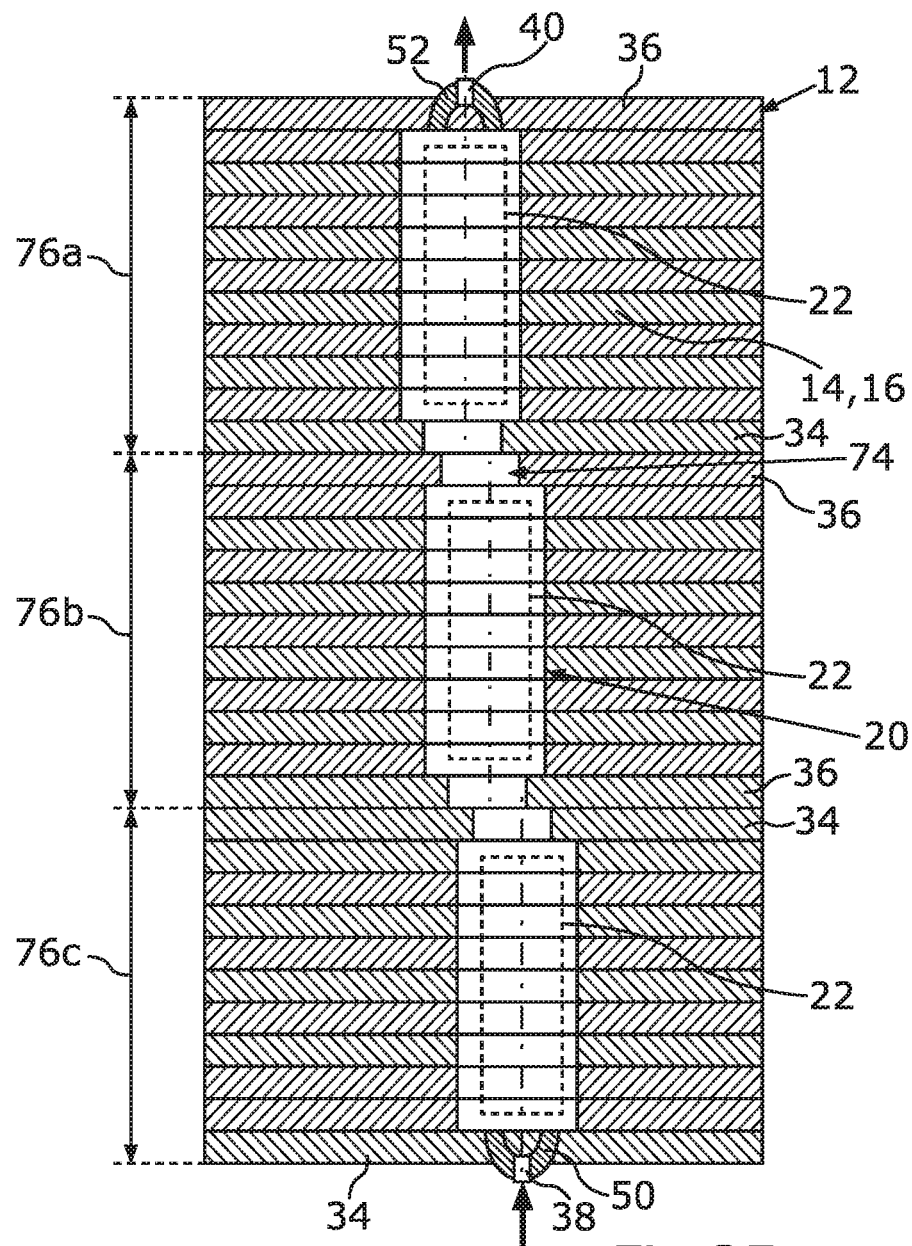
FIG. 25 shows a schematic sectional view of a laminated core of a rotor for the purposes of illustrating the background of the invention.
Figure 26:
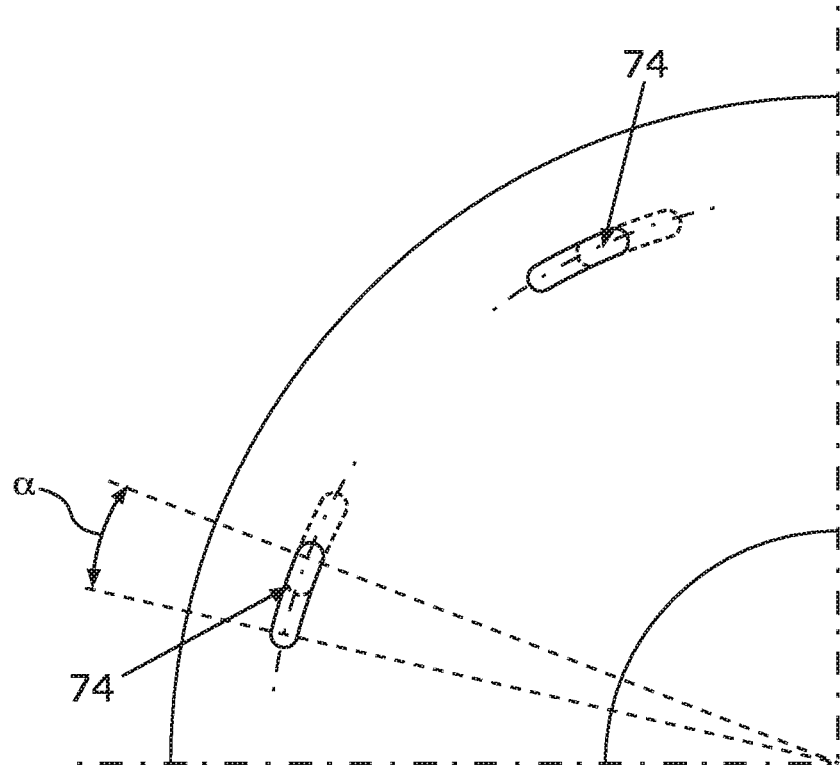
FIG. 26 shows a schematic plan view of a detail of the laminated core as per FIG. 25.

FIGS. 25 and 26 show a laminated core 12 which is assembled from the stated partial laminated cores designated by 76a-c.

Overall, it can be seen from FIGS. 25 and 26 that the inner end plates 34 and 36 have the slots 74 which, despite the fact that the partial laminated cores 76a-c are offset, partially overlap one another, as a result of which the magnet pockets 20 are fluidically connected to one another via the slots 74. Here, an offset angle of the offset is designated by a in FIG. 26.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A rotor for an electrical machine, comprising:
at least one laminated core which has a plurality of magnet pockets arranged in succession in an axial direction of the rotor;
magnets each of which are fixed in the plurality of magnet pockets by a cured potting compound;
at least one distributor system which is formed in the laminated core which fluidically connects the plurality of magnet pockets to one another;
at least one filling channel for each magnet pocket which fluidically connects to the respective magnet pocket;
at least one distributor channel for the distributor system has which is common to the filling channels and which is fluidically connected to the filling channels;
at least one end plate, which is a separate component from and is adjacent to the laminated core in the axial direction of the rotor such that each of the plurality of magnet pockets is adjacent the at least one end plate;
at least one filling opening integrally formed as part of the end plate, the at least one filling opening fluidically connected to the distributor system and via which the potting compound is filled in its liquid state into the distributor system;
a second end plate, which adjoins the laminated core in the axial direction on a side of the laminated core which is opposite from the first end plate in the axial direction; and
at least one ventilation opening defined by the second end plate which is fluidically connected to the distributor system and which serves for the ventilation of the distributor system as the potting compound is filled into the distributor system;
wherein the cured potting compound extends continuously through the distributor system from magnet pocket to magnet pocket.

2. The rotor as claimed in claim 1, further comprising:
a first part of the respective magnet pocket formed by a first individual lamination of the laminated core; and
a second part formed by a second individual lamination which directly adjoins the first part in the axial direction of the rotor of the respective magnet pocket.

3. The rotor as claimed in claim 2, wherein the respective parts differ from one another in terms of at least one of their shapes and inner circumferences.

4. The rotor as claimed in claim 3, wherein the respective parts thereby form at least one undercut of the respective magnet pocket.

5. The rotor as claimed in claim 2, wherein the individual laminations are formed by identical lamination blanks and are rotationally staggered with respect to one another in a circumferential direction of the rotor.

6. The rotor as claimed in claim 2, wherein the individual laminations are formed by lamination blanks that are different from one another.

7. The rotor as claimed in claim 1, wherein the respective magnet pocket has at least one protuberance extending in a radial direction of the rotor.

8. The rotor as claimed in claim 1, wherein the magnet pockets and the magnets are offset.

9. The rotor as claimed in claim 1, further comprising:
a first pocket group of the plurality of magnet pockets, wherein the laminated core has
at least one second pocket group arranged adjacent to the first pocket group in the circumferential direction of the laminated core and which comprises a multiplicity of second magnet pockets arranged in succession in the axial direction of the rotor,
a second plurality of magnets which are fixed in the second magnet pockets by the cured potting compound, wherein the second magnet pockets are fluidically connected to one another via the distributor system, which;
at least one second filling channel for each second magnet pocket fluidically connected to the respective second magnet pocket;
at least one distributor channel which is common to the filling channels and the second filling channels and which is fluidically connected to the filling channels and fluidically connected to the at least one second filling channel for each second magnet pocket; and
wherein the cured potting compound extends continuously through the distributor system from magnet pocket to magnet pocket of the respective pocket group.

10. A method for producing a rotor for an electrical machine, comprising:
- providing at least one laminated core which has a multiplicity of magnet pockets arranged in succession in an axial direction of the rotor;
- providing at least one end plate, which is a separate component from and is adjacent to the at least one laminated core in the axial direction;
- providing at least one filling opening integrally formed as part of the end plate;
- providing a second end plate, which adjoins the laminated core in the axial direction on a side of the laminated core which is opposite from the first end plate in the axial direction;
- providing at least one ventilation opening defined by the second end plate which is fluidically connected to the distributor system;
- arranging at least one magnet in the respective magnet pocket;
- arranging the at least one end plate such that the at least one end plate adjoins the at least one laminated core in the axial direction of the rotor, and each of the plurality of magnet pockets is adjacent the at least one end plate;
- introducing a potting compound into the magnet pockets whereby the magnets are fixed in the magnet pockets;
- forming at least one distributor system which extends in the laminated core and which has, for each magnet pocket, at least one filling channel fluidically connected to the respective magnet pocket, wherein the distributor system has at least one distributor channel which is common to the filling channels and which is fluidically connected to the filling channels;
- fluidically connecting the magnet pockets via the distributor system; and
- fluidically connecting the at least one filling opening to the at least one distributor channel and via which the potting compound is filled in its liquid state into the distributor system;
- introducing the liquid potting compound into the distributor system through the at least one filling opening and into the distributor channel and flowing continuously from the distributor channel into the respective filling channels and from the filling channels into the respective magnet pockets which are fluidically connected to the distributor system;
- ventilating the at least of the distributor system via the at least one ventilation opening as the potting compound is filled into the distributor system.

11. The method as claimed in claim 10, wherein the liquid potting compound is one of filled vertically upward and downward into the distributor channel.

* * * * *